United States Patent [19]
Berger et al.

[11] 3,775,255
[45] Nov. 27, 1973

[54] L-TRANS-2-AMINO-4-(2-AMINOETHOXY)-3-BUTENDIC ACID

[75] Inventors: Julius Berger; David Pruess, both of Passaic; James Parnell Scannell, Bloomfield, all of N.J.

[73] Assignee: Hoffmann-La Roche Inc., Nutley, N.J.

[22] Filed: Mar. 29, 1973

[21] Appl. No.: 346,229

Related U.S. Application Data

[62] Division of Ser. No. 198,449, Nov. 12, 1971.

[52] U.S. Cl. .................................................. 195/80
[51] Int. Cl. ............................................ C12b 1/00

[58] Field of Search ....................................... 195/80

[56] References Cited
UNITED STATES PATENTS
3,428,525    2/1969    Hodge ............................... 195/80 R

*Primary Examiner*—A. Louis Monacell
*Assistant Examiner*—Robert J. Warden
*Attorney*—Samuel L. Welt et al.

[57] ABSTRACT

A new antimicrobial, anthelmintic substance, L-trans-2-amino-4-(2-aminoethoxy)-3-butenoic acid, prepared by a new species of Streptomyces is disclosed.

3 Claims, No Drawings

L-TRANS-2-AMINO-4-(2-AMINOETHOXY)-3-BUTENOIC ACID

RELATED APPLICATIONS

This application is a divisional application of copending application Ser. No. 198,449 filed Nov. 12, 1971 in the names of Berger, Pruess and Scannell.

DESCRIPTION OF THE INVENTION

This invention relates to a new antimicrobial substance and to methods for its production by fermentation, its isolation and purification, and its use as an antimicrobial and anthelmintic agent.

More particularly, the present invention relates to a new antibiotic substance, L-trans-2-amino-4-(2-aminoethoxy)-3-butenoic acid, i.e. to a compound of the formula

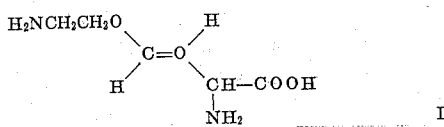

and the pharmaceutically acceptable acid addition salts thereof.

The compound of formula I is produced by a new species of Streptomyces, *Streptomyces sp.* X-11085. This new streptomycete was isolated from a soil sample collected in Arlington, Calif. A viable culture of the organism labelled with the laboratory designation *Streptomyces sp.* X-11085 has been deposited in the Northern Utilization Research and Development Division, Agriculture Research Service, United States Department of Agriculture in Peoria, Ill., where this culture has been added to the NRRL collection under Registration No. NRRL 5331. The species of Streptomyces described herein and identified as *Streptomyces sp.* X-11085 includes strains of Streptomyces which produce the compound of formula I and which cannot be definitely differentiated from the strain NRRL 5331 and its sub-cultures including mutants and variants. By the term "mutants " as used herein there is intended mutants produced from the described organism by various means such as chemical mutagenic agents, ultraviolet radiation, x-radiation, phage exposure and the like. The properties of the compound of formula I are described herein and after these properties are known it is easy to differentiate the strain producing this compound from others.

The following is a general description of the organism Streptomyces sp. X-11085, NRRL 5331, based upon characteristics such as amount of growth, pigment, morphology etc. The descriptive colors and color chips designations are generally those recommended by the International Streptomyces Project (ISP): Shirling E.B. and D. Gottlieb, 1966, "Methods for Characterization of Streptomyces Species," *Intl. J. Systematic Bact.* 16: 313–340. Media used to obtain the diagnostic characteristics and the morphological description discussed below were those prepared by Difco Laboratories for the ISP; identification and content of the media are presented in Table 1.

GENERAL DESCRIPTION OF THE ORGANISM STREPTOMYCES SP. X-11085

AMOUNT OF GROWTH

The culture produces a well-developed and branched substrate mycelium and characteristic abundant powdery aerial mycelium on many media. Colonies are raised, edges undulate. Generally growth is finely granular to coarse, occasionally smooth in center (Bennett agar). Sectoring with "fairy rings" is observed on a few media.

VEGETATIVE MYCELIUM AND SPORE COLOR

After 2 days growth on ISP-2, asparagine and Amidex media, spores en masse are sandy-buff and ivory color, remaining buff even after 10 days. Reverse or vegetative mycelium yellow to orangy yellow to light brown.

MORPHOLOGY

Long filamentous mycelium. Sporophores, long and short, up to 50 spores per chain, with a mixture of straight and flexuous (RF group-Pridham). No spirals. Sporophores branching irregularly often entangled and forking at terminal points or arising as multiple forming clusters. As observed by electron microscopy at magnifications up to 50,000, spores are elongate, cylindrical, smooth to slightly rugose with a sheath, and measure 0.6 × 0.4 to 1.0 × 0.5 microns in size.

PHYSIOLOGY

SOLUBLE PIGMENT

Traces to moderate amount of pigment are produced after 4 days on some media, such as asparagine, Bennett, Emerson, yeast extract-malt extract (ISP-2), milk and gelatin, but not on ISP media 3, 4 and 5 or Amidex, Pablum, tomato agar, tomato-oatmeal, tomato-soyflour or Sp.5 (ATCC No.5). However, after 11 days, brown-black pigment is secreted on Sp. 5, Amidex, tomato-oatmeal, Pablum agars.

REVERSE COLORS

These vary according to the medium used for growth, running from white to buff with no black (as in Pablum, ISP-3, ISP-5, and tomato agar) to smoky-grey to black (as in Sp. 5, Amidex, Asparagine, Bennett, tomato-oatmeal and Emerson agars) after 11 days at 28°.

MISCELLANEOUS PHYSIOLOGICAL REACTIONS

The culture is highly chromogenic (produces melanin) on peptone-iron medium but less so on tyrosine agar. Starch is hydrolyzed and gelatin is liquified partly after only 4 days. Growth is good on milk, with moderate peptonization. The culture grows well at 28° C, producing a colorless exudate after 11 days on many media (eg. Sp. 5, Amidex, asparagine, Bennett, Emerson, Pablum, tomato, tomato-soy). The culture grows well at 28° and 35° but does not grow at 45°, 47° and 50°.

Based on spore ornamentation, general morphology of spores and the branching of sporophores, the colors en masse on various media and certain biochemical and physiological reactions, it is concluded that *Streptomyces sp.* X-11085 is different from any of the cultures of the RF group described in the literature.

Cultivation of the organism *Streptomyces sp.* X-11085 to produce the desired compound of formula I may be carried out utilizing a variety of fermentation techniques. In general the following basic techniques can be employed in both flask and tank procedures.

In the flask fermentation a loopful of spores from an agar slant of the culture is inoculated into 100 ml of nutrient medium in a 500 ml Erlenmeyer flask and incubated at about 28° C on a rotary shaker for up to 3 days. The inoculum nutrient medium contains a nitrogen source, preferably selected from an acid or enzyme hydrolyzed protein source such as enzyme hydrolyzed milk products, enzyme hydrolyzed bean meal products and the like, a carbohydrate source such as glucose; and inorganic salts such as phosphates, sodium chloride, and the like. Trypticase soy broth prepared by the Baltimore Biological Laboratories is the preferred inoculum medium. After incubation in the inoculum medium for up to three days small samples of the broth are transferred to the culture medium where they are incubated at about 28° C on a rotary shaker for from about 1 to 5 days. Whole broth samples are aseptically removed periodically for in vitro assays, usually every second day. For preparation of larger volumes of broth, inoculum is first prepared in 6 liter Erlenmeyer shakeflasks or in 5 gallon pyrex bottles, fitted for aeration, sampling etc. This broth is then transferred to the tank fermentors. Aeration in bottles and tanks is provided by forcing sterile air through the fermenting medium. In tanks, further agitation is provided by mechanical impellers. Antifoam agents such as lard oil, soybean oil, silicone surfactants, etc. are added as needed to control foam.

*Streptomyces sp.* X-11085 may be cultured in a variety of liquid culture media. Media which are especially useful for the production of the new antibiotic include an assimilable carbon source such as starch, glucose, molasses and the like, an assimilable nitrogen source such as protein, protein hydrolysate, polypeptides, amino acids, corn steep liquor, ammonium salts, and inorganic cations and anions, such as potassium, sodium, calcium, magnesium, sulfate, phosphate, chloride etc. Trace elements such as cobalt, copper, iron, molybdenum, boron etc. are supplied as impurities of other constituents of the media.

The activity of the compound of formula I can be measured in vitro by its zone of inhibition against the microorganism *Streptomyces cellulosae* 097. In this assay method a paper disc agar diffusion microbiological assay was used to detect and quantitatively measure the compound of formula I. Inoculum was prepared from *Streptomyces cellulosae* 097, grown for about 3 days at 28° C on a rotary shaker in 500 ml Erlenmeyer flasks containing 60 to 80 ml of medium composed of (in grams per liter): glucose — 2.0; $K_2HPO_4$ — 7.0; $KH_2PO_4$ — 3.0; sodium citrate · $2H_2O$ — 0.5; $MgSO_4 · 7H_2O$ — 0.1; $(NH_4)_2SO_4$ — 1.0; and agar 15.0. The cells were washed three times with water to remove excess nutrients and adjusted to an optical density of 1.2 (wave length, 500 nm; path length, 15.5 mm); 30 ml of washed cell suspension was added to 1 liter of molten minimal-agar of Davis and Mingioli (*J. of Bacteriology*, Vol. 16 pgs. 17–28, 1950) just prior to distribution. Five ml. portions of this inoculated medium were pipetted into Petri dishes (100 by 15 mm). After the agar solidified, the dishes were stored at 4° C and used within a week. Samples to be assayed were applied to paper discs which were then placed on the agar. After incubation overnight at 28° C the diameters of the zones of inhibition were measured: the zone diameters were found to be proportional to the log of the concentration between 10 and 1,000 mcg per ml of the compound of formula I. A two fold increase in the concentration of the compound of formula I increased the zone diameter by 3.5 mm.

Illustrations of the types of media that are preferably used and the antibiotic yields they support in shaken flask fermentations are presented in Table 2. From an examination of the data compiled in this table, it can be seen that complex nitrogenous material from varying sources will support antibiotic production, for example: plant materials such as soybean flour; animal materials such as meat meal digest; and microbial materials such as yeast.

A number of carbon sources permit good growth and antibiotic production, for example, glucose, glycerol, dextrin and corn starch. In addition to the inorganic salts already present in natural media, supplementation with salts such as potassium phosphate, calcium carbonate, magnesium sulfate and trace elements will sometimes increase growth and antibiotic yield (depending on the constituents already present in the basal medium). One of the preferred media for production of the compound of formula I in large fermenters contains in grams per liter: glucose 10.0; enzyme hydrolyzed protein such as Bacto peptone prepared by Difco 5.0; yeast extracts such as Bacto yeast extract prepared by Difco 3.0; and $Fe(NH_4)_2(SO_4)_2 · 6H_2O$ 0.031.

After fermentation is complete a variety of procedures can be employed for the isolation and purification of the compound of formula I. Suitable isolation and purification procedures include ion exchange chromatography, partition chromatography and adsorption chromatography.

In a preferred aspect the compound of formula I is recovered from the culture medium by separation of the mycelium and any undissolved solids from the fermentation broth by conventional means, such as by filtration or centrifugation. The compound of formula I is then separated from the filtered or centrifuged broth using either ion exchange chromatography or adsorption chromatography. The adsorption chromatography procedure is preferably effected by adsorption of impurities onto a charcoal such as Norite A. The ion exchange chromatography can be performed using either a hydrogen form or an alkali metal ion form, i.e. the sodium form, of an ion exchange resin. The partition chromatography is preferably effected using a silica gel support and an alcohol, water, ammonia solvent. It is of course understood that the isolation and purification of the compound of formula I can be accomplished using a combination of any of the above described techniques.

After filtration or centrifugation of the fermentation medium, thin layer or paper chromatography techniques can be employed to analyze for the compound of formula I. Because of the chemical characteristics of said compound, visualization of the spots can be achieved using ninhydrin spray; in addition bioautography can also be employed advantageously. The chromatography may be carried out on paper but is preferably performed on silica gel glass plates or on cellulose plates. The solvent system employed for thin layer chromatograms consists of ethanol/$H_2O$/$NH_3$, 49/49/2 when silica gel plates are employed and phenol/$H_2O$, 80/20, when cellulose plates are employed. In the final crystallization of the compound of formula I, this compound can be obtained as a zwitter-ion or as its mono- or di- acid salt, for example as its mono-or di- hydrochloride.

The novel compound of formula I above forms pharmaceutically acceptable acid addition salts with organic or inorganic acids. Suitable acids for this purpose include the hydrohalic acids such as hydrochloric acid and hydrobromic acid, other mineral acids such as sulfuric acid, phosphoric acid, nitric acid and the like, and organic acids such as tartaric acid, citric acid, acetic acid, formic acid, maleic acid, succinic acid and the like. These salts can be used for the same biological purposes as the zwitterion form. Since solutions of salts of the compound of formula I, especially the monohydrochloride, are considerably more stable than solutions of the zwitterion, it is preferable to use slightly acid conditions for purification.

The compound of formula I exhibits antimicrobial, antiprotozoal and anthelmintic activity so that said compound is useful as an antimicrobial, antiprotozoal, or anthelmintic agent. The anti-microbial spectrum shown in Table 3 was determined by employing agar diffusion cup-plate assays as described earlier.

The antiprotozoal activity of the compound of formula I is shown, for example, by its activity against *Trichomonas vaginalis*. In this test there are eight mice used in each group. An infected but untreated control group is used. The animals are injected with approximately 500,000 cells subcutaneously on the abdominal surface. The animals are then treated subcutaneously with varying amounts of the test drug in 1 ml. of solution at the site of infection on the day of infection. The mice are examined the second day after infection for lesions at the site of infection. The number of animals with lesions and the number of lesion-free animals are determined for each dose level tested. The $CD_{50}$ (curative dose) is calculated using the method of Reed and Muench (*American Journal of Hygiene*, Vol. 27, page 493, 1938) and is expressed in mcg/ml. In this test the compound of formula I showed a $CD_{50}$ of 10 mcg per ml. thus indicating its activity as an antiprotozoal agent.

The anthelmintic activity of the compound of formula I is shown by its activity against *Ascaris suum* in mice. In this test 4 mice per group are used. Four mice are employed as non-infected non-medicated controls and four mice as infected non-medicated controls. The drug is given 24 hours prior to infection. 100 to 200 mg. of the test drug are mixed with 100 g. of mouse diet. The infection consists of administering approximately 2,000 to 4,000 embryonated ascaris eggs orally to each mouse. Treatment is continued for an additional 7 days post infection. 7 Days after infection the mice are sacrificed, the lungs removed, compressed by means of two micro slides and examined. The slides are examined microscopically and the larvae counted. The percent reduction of larvae in the lungs of medicated infected mice as compared with the infected, non-medicated controls is determined and the results expressed as the percent reduction of larvae. In this test the compound of formula I showed a 71% reduction, thus indicating that said compound is active against *Ascaris suum*.

The novel compound of formula I exhibits low oral and parenteral toxicity. In mice the antibiotic shows $LD_{50}$ values of 500 mg. when administered orally or subcutaneously.

The nature and objects of the present invention can be more fully understood by making reference to the following examples. Unless otherwise indicated, all temperatures are given in degrees Centigrade and all parts given are parts by weight.

EXAMPLE 1

FERMENTATION OF STREPTOMYCES SP. X-11085

A spore suspension of *Streptomyces sp.* X-11085 from a nutrient agar test tube slant was inoculated into a 6 liter Erlenmeyer flask containing 2 liters of Trypticase soy broth (Baltimore Biological Laboratories). The flask was incubated at 28° C for 72 hours on a rotary shaker (240 rpm with a 2 inch stroke). Four liters of this inoculum was then added to 227 liters of fermentation medium containing in g/liter:

| | |
|---|---|
| Cerelose (Corn Products) | 10.0 |
| Bacto-Peptone (Difco) | 5.0 |
| Bacto-yeast extract | 3.0 |
| Ferrous ammonium sulfate-hexahydrate | 0.03 |

The pH of the medium was adjusted to 6.8 with sodium hydroxide before sterilization. The culture was incubated at 28° C in a 380 liter fermentor, aerated at 85 lpm and agitated at 200 rpm. A silicone antifoam agent, Dow Corning AF, was added as needed to control frothing. After 41 hours the contents of the fermentor were filtered by centrifugation through infusorial earth.

EXAMPLE 2

Purification of L-trans-2-amino-4-(2-aminoethoxy)-3-butenoic acid 426 liters of filtered fermentation broth, obtained as described in Example 1, which contained 3.1 kg of solids was passed through a 12 inch diameter column which contained 50 L Dowex 50WX4 resin (50–100 mesh in the $H^+$ form). The column was successively washed with:

1. 50 l $H_2O$;
2. 200 l 5% aqueous pyridine solution;
3. 50 l $H_2O$.

The active material was then eluted with 200 l of 1.0M $NH_4OH$ in aqueous solution. The first 80 liters of eluate obtained after the pH of the eluate rose above 9.0 contained almost all of the active material. The active fractions were evaporated at reduced pressure to a 2 l. concentrate which contained 64 g solids. The pH of the concentrate was adjusted to 3.3 with 5N HCl solution as 340 g of Norite A charcoal was suspended in the concentrate. The suspension was then filtered through a sintered glass funnel containing a celite Hyflo pad on top of which was layered an additional 70 g of Norite A charcoal. A combined volume of 5 l of filtrate and water wash of the cake contained essentially all of the active material (42 g of solids). After evaporation at reduced pressure a 31 ml portion of the concentrate which contained 18 g of solids was diluted with 65 ml of solvent - ethanol/$H_2O$/$NH_4$ OH: 85/15/5 and this solution was applied to a column 90cm x 8cm i.d. which contained 4.7 l Merck silica gel, 0.05–0.2 mm previously slurried in a solvent consisting of ethanol/$H_2O$/$N$-$H_4OH$: 85/15/5. The column was then developed with the same solvent and the activity was found in a 4.8 l fraction which appeared after 12 l of solvent had passed through the column. The active fraction was concentrated to 200 ml and the concentrate passed through 50 ml AG50WX4 resin (50–100 mesh in the H+ form). After washing the column with water and 10% aqueous pyridine solution, the activity was eluted with 1.5 M NH₄OH solution. This eluate was concentrated to 80 ml and the pH adjusted to 3.3 with 7.4 ml 1 N HCl solution. The solution was further concentrated to a syrup and crystallization was effected from 20 ml methanol-water (19/1) to yield L-trans-2-amino-4-(2-aminoethoxy)-3-butenoic acid hydrochloride. A second crop was crystallized from 20 ml methanol-H₂O (49/1) m.p. 185°–186°, $[\alpha]_D^{25°}$ + 85.8 (c, 1%, H₂O).

EXAMPLE 3

Purification of L-Trans-2-amino-4-(2-aminoethoxy)-3-butenoic acid 36 g of solids, partially purified using any combination of purification techniques including adsorption chromatography, partition chromatography and ion exchange chromatography were dissolved in 250 ml H₂O and the pH of the solution was adjusted to 3.6 with 5N HCl. The solution was applied to a column, 60 cm × 7 cm id., containing 2.5 l AG50WX4 (100–200 mesh, Na+ form) cation exchange resin. The column was eluted with 0.2M sodium phosphate-citrate buffer, pH 5.5, until the activity appeared in the eluate at an elution volume between 6.2 and 9.1 l. Salts were removed from the active fraction by passing the solution through 1.2 l AG50WX4 (50–100 mesh, H+ form) cation exchange resin. The activity was eluted from the column with 1.5N NH₄OH solution and after evaporation at reduced pressure L-trans-2-amino-4-(2-aminoethoxy)-3-butenoic acid hydrochloride was crystallized as described in Example 2.

EXAMPLE 4

Parenteral Formulation

Ingredients:

| | Amount per cc |
|---|---|
| L-Trans-2-amino-4-(2-aminoethoxy)-3-butenoic acid hydrochloride | 5.1 mg |
| Benzyl Alcohol | 0.1 cc |
| Water for Injection, U.S.P. q.s. ad | 1.0 cc |

PROCEDURE (FOR 10,000 CC)

1. In a clean glass or glass-lined vessel, 8,000 cc of Water for Injection were heated to 90° C. It was then cooled to 50°–60° C., and benzyl alcohol was added and dissolved with stirring. The solution was then allowed to cool to room temperature. The pH of the solution was adjusted to between 5–7 by addition of HCl.

2. The 51.0 grams of L-trans-2-amino-4-(2-aminoethoxy)-3-butenoic acid hydrochloride was added under an atmosphere of nitrogen and stirred until completely dissolved.

3. Sufficient Water for Injection was then added to make a total volume of 10,000 cc.

4. This solution was then filtered through an 02 Selas candle, filled into suitable size ampuls, gassed with nitrogen and sealed.

EXAMPLE 5

5.0% CREAM

| | Mg. Per Gram |
|---|---|
| L-trans-2-amino-4-(2-aminoethoxy)-3-butenoic acid | 50.00 |
| Stearyl Alcohol | 100.00 |
| Cetyl Alcohol | 15.00 |
| White Petrolatum | 70.00 |
| Methyl Parahydroxybenzoate, U.S.P. | 2.00 |
| Propyl Parahydroxybenzoate, U.S.P. | 0.50 |
| Isopropyl Palmitate | 60.00 |
| Polyoxyl 40 Stearate, U.S.P. | 40.00 |
| Propylene Glycol | 120.00 |
| Disodium Versenate | 0.10 |
| Distilled Water | 548.16 |

PROCEDURE

1. The stearyl alcohol, cetyl alcohol, petrolatum, propyl parahydroxybenzoate, isopropyl palmitate and polyoxyl 40 stearate were melted at 75° C. The mixture was cooled to and maintained at 70° C.

2. Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring.

3. When the temperature of the ointment reached 55° C., a solution of L-trans-2-amino-4-(2-aminoethoxy)-3-butenoic acid was added and mixed with the ointment.

4. When the temperature of the ointment reached 50° C., cold water was circulated in the jacket of the kettle and the ointment was cooled to 30° C. with stirring. The ointment was then transferred to storage containers.

EXAMPLE 6

Tablet Formulation

| | Per Tablet |
|---|---|
| L-trans-2-amino-4-(2-aminoethoxy)-3-butenoic acid | 100 mg |
| Lactose, U.S.P. | 202 mg |
| Corn Starch, U.S.P. | 80 mg |
| Amijel BO11* | 20 mg |
| Calcium Stearate | 8 mg |
| Total Weight | 401 mg |

*A prehydrolyzed food grade corn starch. Any similar prehydrolyzed corn starch may be used. Purchased from:
Corn Products Company,
10 East 56th Street,
New York, New York.

PROCEDURE

1. L-trans-2-amino-4-(2-aminoethoxy)-3-butenoic acid, lactose, corn starch, and Amijel BO11 were blended in a suitable mixer.

2. The mixture was granulated to a heavy paste with water and the moist mass was passed through a No. 12 screen. It was then dried overnight at 100° F.

3. The dried granules were passed through a No. 16 screen and transferred to a suitable mixer. The calcium stearate was added and mixed until uniform.

4. The mixture was compressed at a tablet weight of 410 mg using tablet punches having a diameter of approximately ⅜ inch. (Tablets may be either flat or biconvex and may be scored if desired.)

EXAMPLE 7

Capsule Formulation

| | Per Capsule |
|---|---|
| L-trans-2-amino-4-(2-aminoethoxy)-3-butenoic acid | 10 mg |
| Lactose, U.S.P. | 165 mg |
| Corn Starch, U.S.P. | 30 mg |
| Talc, U.S.P. | 5 mg |
| Total Weight | 210 mg |

PROCEDURE

1. L-trans-2-amino-4-(2-aminoethoxy)-3-butenoic acid, lactose and corn starch were mixed in a suitable mixer.

2. The mixture was further blended by passing through a Fitzpatrick Comminuting Machine with a No. 1A screen with knives forward.

3. The blended powder was returned to the mixer, the talc added and blended thoroughly.

4. The mixture was filled into No. 4 hard shell gelatin capsules on a Parke Davis capsulating machine. (Any similar type capsulating machine may be used.)

TABLE 1

Medium 2: Yeast Extract-malt extract agar
ISP   Bacto-Yeast Extract (Difco)           4.0 g
      Bacto-Malt Extract (Difco)           10.0 g
      Bacto-Dextrose (Difco)                4.0 g
      Distilled water                       1.0 liter
      Adjust to pH 7.3, then add
      Bacto Agar                           20.0 g Liquify agar by steaming at 100° C for 15–20 minutes.
Dispense appropriate amount for slanting into at least 6 tubes for each culture. Sterilize by autoclaving; cool tubes as slants.

Medium 3: Oatmeal Agar
ISP   Oatmeal                              20.0 g
      Agar                                 18.0 g Cook or steam 20 g oatmeal in 1000 ml distilled water for 20 minutes.
Filter through cheese cloth.
Add distilled water to restore volume of filtrate to 1000 ml.
Add trace salts solution . . . 1.0 ml solution of 0.1 g of each of $FeSO_4.7H_2O$, $MnCl_2.4H_2O$ and $ZnSO_4.7H_2O$ in 100 ml. distilled water.
Adjust to pH 7.2 with NaOH.
Add 18 g. agar; liquify by steaming at 100° C for 15–20 minutes.

Medium 4: Inorganic Salts—starch agar
ISP
Solution I: Difco soluble starch 10.0 g. Make a paste of the starch with a small amount of cold distilled water and bring to a volume of 500 ml.
Solution II: $K_2HPO_4$ (anhydrous basis)   1.0 g
            $MgSO_4.7H_2O$                  1.0 g
            NaCl                            1.0 g
            $(NH_4)_2SO_4$                  2.0 g
            $CaCO_3$                        2.0 g
            Distilled water                 500 ml Trace salts solution . . . 1.0 ml of solution as in medium 3
pH should be between 7.0 and 7.4. Do not adjust if it is within this range.
Mix starch suspension and salts solution.
            Add agar (Difco)               20.0 g Liquify agar by steaming at 100°C for 15–20 minutes.

Medium 5: Glycerol—asparagine agar
ISP   L-Asparagine (anhydrous basis)        1.0 g
      Glycerol                             10.0 g
      $K_2HPO_4$ (anhydrous basis)          1.0 g
      Distilled water                       1.0 l.

Trace salts solution . . . 1.0 ml of solution as in medium 3
The pH of this solution is about 7.0–7.4. Do not adjust it if it is within this range.
            Agar                           20.0 g Liquify agar by steaming at 100°C for 15–20 minutes.

Bennett's Agar (J. Bact., 57, 142 (1949))     gm/liter
      Yeast extract                         1.0
      Beef extract                          1.0
      N-Z-Amine A                           2.0
      Glucose                              10.0
      Dist. $H_2O$
      Agar                                 18.0
      pH 7.3

Amidex (Corn Products)                       gm/liter
      Amidex                               10.0
      N-Z-Amine A                           2.0
      Beef extract                          1.0
      Yeast extract                         1.0
      $CoCL_2.6H_2O$                       20 mg
      Agar                                 20.0
      Dist. $H_2O$ Pablum Extract Agar                          gm/liter
      Pablum                               60.0
      Agar                                 15.0
      Tap $H_2O$ Emerson's Agar (J. Bact., 55, 411 (1948))

$H_2O$ Dist.                         1000 ml
      NaCl                                 2.5 g
      Peptone                              4.0 g
      Yeast Extract                        1.0 g
      Beef Extract                         4.0 g
      Adjust pH to 7.0 with KOH
      Add Bacto-dextrose                   10.0 g
      Agar                                 30.0 g Tomato Oatmeal Agar                          gm/liter
      Baby Oatmeal                         20
      Tomato paste                         20
      Agar                                 20
      Tap $H_2O$                           1 liter
      pH 6.8–7.3

Tomato Soyflour Paste Agar                   gm/liter
      Glucose                              10
      $K_2HPO_4$                            1
      Tomato Paste                         20
      Wilsons Peptone                       1
      $CaCO_3$                              2
      Agar                                 15
      Tap $H_2O$ Sporulation Broth No. 5 (ATCC)               gm/liter
      Yeast Extract                         1.0
      Beef Extract                          1.0
      Tryptose                              2.0
      $FeSO_4.7H_2O$                       trace
      Glucose                              10
      Agar                                 15
      Dist. $H_2O$                         1 liter
      adjust pH to 7.2

TABLE 2

Fermentation Media

| Media Composition | g/l | Antibiotic Potency γ/ml |
|---|---|---|
| BB Broth | | 1.0 |
| Glucose | 2.0 | |
| $K_2HPO_4$ | 7.0 | |
| $KH_2PO_4$ | 3.0 | |
| $Na_3$ citrate.$2H_2O$ | 0.5 | |
| $MgSO_4.7H_2O$ | 0.1 | |
| $(NH_4)_2SO_4$ | 1.0 | |
| CB Broth | | 0.1 |
| Glucose | 10.0 | |
| N-Z-Amine Type A (Sheffield) | 10.0 | |
| $MgCl_2.6H_2O$ | 0.2 | |
| $CaCl_2.2H_2O$ | 0.025 | |
| $FeCl_3.6H_2O$ | 0.001 | |
| $ZnCl_2$ | 0.0005 | |
| $CuCl_2.2H_2O$ | 0.0005 | |
| $MnCl_2.2H_2O$ | 0.0005 | |
| CC Broth | | 0.1 |
| Monosodium glutamate | 10.0 | |
| Glucose | 10.0 | |
| $K_2HPO_4$ | 4.0 | |
| $KH_2PO_4$ | 2.0 | |
| $MGCl_2.6H_2O$ | 0.2 | |
| $CaCl_2.2H_2O$ | 0.025 | |
| $FeCl_3.6H_2O$ | 0.001 | |
| $ZnCl_2$ | 0.0005 | |
| $CuCl_2.2H_2O$ | 0.0005 | |
| $MnCl_2.2H_2O$ | 0.0005 | |
| CD Broth | | 10.0 |
| Soyalose (Central Soya) | 10.0 | |
| Soluble starch (Nutritional Biochemical | 10.0 | |
| Corn steep liquor (Corn Products) | 0.5 | |
| $K_2HPO_4$ | 0.5 | |
| $CaCO_3$ | 0.5 | |
| pH adjusted to 7.5 | | |
| CE Broth | | 10.0 |
| Glucose (Cerelose — Corn Products) | 10.0 | |
| Bacto-peptone (Difco) | 5.0 | |
| Bacto-yeast extract (Difco) | 3.0 | |
| $Fe(NH_4)_2(SO_4)_2.6H_2O$ | 0.031 | |

TABLE 3 in vitro antimicrobial spectra of the compound of formula I

| Test Organism | Diameter of Inhibition Zones[1] in mm. Formula I Compound-1 mg/ml |
|---|---|
| *Escherichia coli* | (17) |

| | |
|---|---|
| *Bacillus simplex* | (32) |
| *Staphylococcus aureus* | (24) |
| *Streptomyces cellulosae* 097 | 51 |
| *Bacillus cereus* | 65 |

¹Values given in parenthesis are for hazy zones of inhibition.

We claim:

1. A process for preparing the antibiotic L-trans-2-amino-4-(2-aminoethoxy)-3-butenoic acid which comprises cultivating *Streptomyces sp.* X-11085,-NRRL 5331 in an aqueous nutrient medium containing assimilable sources of carbohydrate, nitrogen and inorganic salts under submerged aerobic conditions until substantial antibiotic activity is imparted to said medium by the production of L-trans-2-amino-4-(2-aminoethoxy)-3-butenoic acid and then recovering said antibiotic so produced from the aqueous medium.

2. A process according to claim 1 in which recovery of L-trans-2-amino-4-(2-aminoethoxy)-3-butenoic acid is accomplished by filtering the aqueous medium, adsorbing the antibiotic on a cation exchange resin and retrieving the antibiotic from the resin.

3. A process according to claim 3 in which recovery of L-trans-2-amino-4-(2-aminoethoxy)-3-butenoic acid in accomplished by filtering the aqueous medium, separating the antibiotic by partition chromatography on silica gel and retrieving the antibiotic from the silica gel.

* * * * *